(12) United States Patent
Arakawa et al.

(10) Patent No.: US 7,085,965 B2
(45) Date of Patent: Aug. 1, 2006

(54) APPARATUS AND METHOD FOR ACCESSING A DISK CONTAINING AN ALTERNATE SECTOR

(75) Inventors: Yutaka Arakawa, Ome (JP); Yasuhiko Ichikawa, Hamura (JP); Akio Mizuno, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 531 days.

(21) Appl. No.: 10/355,204

(22) Filed: Jan. 31, 2003

(65) Prior Publication Data
US 2003/0191982 A1 Oct. 9, 2003

(30) Foreign Application Priority Data
Apr. 9, 2002 (JP) ............................. 2002-106638

(51) Int. Cl.
*G06F 11/00* (2006.01)
(52) U.S. Cl. ............................................ 714/42; 714/8
(58) Field of Classification Search ................ 714/42, 714/54, 8
See application file for complete search history.

(56) References Cited

U.S. PATENT DOCUMENTS

| | | | | |
|---|---|---|---|---|
| 4,774,700 | A * | 9/1988 | Satoh et al. ............. | 369/47.14 |
| 5,357,381 | A | 10/1994 | Yasuda et al. | |
| 5,732,050 | A | 3/1998 | Horie | |
| 5,751,947 | A | 5/1998 | Arakawa | |
| 6,470,412 | B1 * | 10/2002 | Kisaka et al. .................. | 711/4 |
| 6,530,034 | B1 * | 3/2003 | Okada et al. .................. | 714/5 |
| 2001/0013985 | A1 * | 8/2001 | Baba et al. ................... | 360/60 |
| 2002/0071193 | A1 * | 6/2002 | Ogawa et al. ................ | 360/31 |
| 2002/0196718 | A1 | 12/2002 | Okazaki et al. | |
| 2003/0163759 | A1 | 8/2003 | Arakawa | |

FOREIGN PATENT DOCUMENTS

| | | |
|---|---|---|
| EP | 0 606 499 B1 | 7/1994 |
| JP | 63-316368 | 12/1988 |
| JP | 1-166378 | 6/1989 |
| JP | 4-162127 | 6/1992 |
| JP | 5-182369 | 7/1993 |
| JP | 8-77729 | 3/1996 |
| JP | 10208401 | 8/1998 |
| JP | 10275425 | 10/1998 |
| JP | 2001-312376 | 11/2001 |
| JP | 2002-184117 | 6/2002 |

OTHER PUBLICATIONS

Search and Examination Reports, dated Feb. 20, 2004, from the Australian Patent Office for Patent Application No. SG 200300096-5.
U.S. Appl. No. 10/291,574 filed Nov. 12, 2002, inventor Arakawa.

* cited by examiner

*Primary Examiner*—Dieu-Minh Le
(74) *Attorney, Agent, or Firm*—Pillsbury Winthrop Shaw Pittman, LLP (57) ABSTRACT

A CPU determines whether or not the disk access range designated by a read/write command from a host contains a defective sector. If the disk access range contains a defective sector, the CPU suspends disk access when a head has reached the defective sector. In this state, the CPU activates a buffer access circuit. The buffer access circuit copies data between an area of an alternate sector buffer and data buffer. The area of the alternate sector buffer stores data corresponding to the data written in the alternate sector allocated to the defective sector reached by the head.

22 Claims, 6 Drawing Sheets

APPARATUS AND METHOD FOR ACCESSING A DISK CONTAINING AN ALTERNATE SECTOR

CROSS-REFERENCE TO RELATED APPLICATIONS

This application is based upon and claims the benefit of priority from the prior Japanese Patent Application No. 2002-106638, filed Apr. 9, 2002, the entire contents of which are incorporated herein by reference.

BACKGROUND OF THE INVENTION

1. Field of the Invention

The present invention relates to a disk storage apparatus in which an arbitrary sector in an alternate area on a disk is allocated as an alternate sector for a defective sector on the disk. Particularly, it relates to an apparatus and method for accessing a disk containing an alternate sector, which enable high speed disk access even if the disk access range designated in a read/write request from a host contains a defective sector, making it necessary to access an alternate sector allocated to the defective sector.

2. Description of the Related Art

In general, in disk storage apparatuses, represented by hard disk drives (magnetic disk drives), alternate sector processing is performed on defective sectors of a disk. A defective sector is on in which an error has occurred a predetermined number of times during disk access. "Alternate sector processing" means the allocation of another sector on the disk in place of the defective sector. The sector allocated to the defective sector is called an alternate sector. The track containing the alternate sector is called an alternate track. Alternate tracks are provided in a special area (alternate area) on the disk, which differs from normal tracks.

In disk storage apparatuses, disk access is performed in accordance with a read/write command (disk access command) supplied from a host. In the case that a defective sector, to which an alternate sector is allocated, is found in the disk access range designated by the read/write command, both a normal track and alternate track are accessed. The alternate track is secured in an area different from that of normal tracks that contain the defective sector. Accordingly, to access the alternate sector, it is necessary to perform a so-called seek operation for moving a head from the normal track, containing the defective sector to which the alternate sector is allocated, to the track (alternate track) containing the alternate sector.

Disk access processing, performed when a seek operation for moving a head from a normal track to an alternate track is necessary, is executed in the following manner. Firstly, when a defective sector is accessed during accessing a normal track, disk access is temporarily stopped. In this state, a seek operation for moving the head to the alternate track containing the alternate sector is performed. After the seek operation is finished, the alternate sector is accessed. After the access to the alternate sector normally finishes, disk access is temporarily stopped to re-access the normal track. In this state, a seek operation for moving the head from the alternate track back to the normal track is performed.

Thus, if a defective sector is found in the disk access range designated by a read/write command from a host, a seek operation for moving the head from the track (normal track) containing the defective sector to the track containing the alternate sector allocated to the defective sector is performed. Therefore, even if the positional relationship between the defective sector and alternate sector is optimally set, at least the time corresponding to one rotation of the disk is necessary until the alternate sector is accessed after the start of the seek operation. Similarly, at least the time corresponding to one rotation of the disk is necessary until the sector following the defective sector is accessed after the start of the seek operation for moving the head from the alternate track to the normal track. If the positional relationship between the defective sector and alternate sector cannot be set optimally, the time corresponding to several rotations of the disk is necessary until the head is moved from the normal track to the alternate track to access the alternate sector. Similarly, the time corresponding to several rotations of the disk is necessary until the head is returned from the alternate track to the normal track to access the sector following the defective sector. In other words, the disk access performance, including the access to an alternate sector, depends upon the positional relationship between defective and alternate sectors. A series of disk access operations including access to an alternate sector will be referred to as "alternate sector access".

Jpn. Pat. Appln. KOKAI Publication No. 1-166378 discloses a method (this will hereinafter be referred to as a "first alternate sector access method"), in which if writing of data to a disk area containing a defective sector is requested by a host, the data to be written to the defective sector is once written to a memory. The data in the memory is copied to an arbitrary alternate sector after disk access requested by the host finishes. Further, if reading of data from a disk area that contains a defective sector is requested by the host, the data written in the corresponding alternate sector (i.e. the data in the alternate sector) is once copied to the memory. To read this data, the memory is accessed instead of accessing the alternate sector corresponding to the defective sector. As a result, the data from the alternate sector, copied to the memory, is read.

As described above, in the first alternate sector access method, the data stored in each alternate sector is loaded to a memory. In this case, if a host has issued a request to access a disk, actual access is made to normal tracks, whereas, concerning alternate sectors, data is copied from the memory instead of accessing them. This can dispense with the operation of seeking alternate tracks. Accordingly, in the first alternate sector access method, the time required for accessing each alternate sector can be made constant regardless of the positional relationship between the defective sector and corresponding alternate sector.

However, in the first alternate sector access method, accessing a disk and copying of data from the memory cannot be performed simultaneously. Therefore, if a defective sector is found during disk access, it is necessary to temporarily stop disk access, then copy data from the memory, and resume disk access. In short, the first alternate sector access method cannot realize the same access performance as normal disk access.

Jpn. Pat. Appln. KOKAI Publication No. 4-162127 discloses a method (this will hereinafter be referred to as a "second alternate sector access method"), which is similar to the above first alternate sector access method. The second alternate sector access method is characterized in that, even if a normal track contains a larger number of defective sectors than preparatory sectors provided in the track, the track is not considered defective as long as it satisfies a predetermined condition. The predetermined condition is that the number of defective sectors does not exceed a predetermined number K (K≧the number of preparatory sectors provided for each track). In this case, alternate sectors on each alternate track are allocated only to the defective sectors that are obtained by subtracting the preparatory sectors for each track from all defective sectors on each track, thereby reducing the memory capacity required for alternate sectors. However, also in the second alternate sector access method, no consideration is given to realization of the same access performance as in normal disk access.

Jpn. Pat. Appln. KOKAI Publication No. 5-182369 discloses a method (this will hereinafter be referred to as "third alternate sector access method"), which is similar to the above-described first alternate sector access method. The third alternate sector access method is characterized in that the data written in each alternate sector on a disk (i.e. the data in each alternate sector) is copied to a memory when the disk storage apparatus is turned on. In this case, when it is necessary to write data to an alternate sector, the data is written to both the alternate sector and the memory. Further, if it is necessary to read data from an alternate sector, the data is read from the memory, but not from the alternate sector. Also in the third alternate sector access method, no consideration is given to realization of the same access performance as in normal disk access.

BRIEF SUMMARY OF THE INVENTION

An embodiment of the present invention may provide an apparatus and method for disk access including alternate sector access, which can realize the same access performance as in normal disk access, even if access is made to the disk access range designated by a read/write command from a host, the disk access range containing an alternate sector allocated to a defective sector.

According to an aspect of the invention, there is provided an apparatus in which an arbitrary sector in the alternate area of a disk is allocated as an alternate sector to a defective sector on the disk. This apparatus comprises an alternate sector buffer, data buffer, buffer access circuit and disk access controller. The alternate sector buffer is used to store data corresponding to data written in the alternate sector allocated to the defective sector. The data buffer is used to store data read from the disk and to be transferred to a host using the apparatus, and data transferred from the host and to be written to the disk. The buffer access circuit copies data between the alternate sector buffer and the data buffer. The disk access controller controls disk access requested by a read/write command supplied from the host. During the disk access, data is transferred between the disk access range on the disk designated by the read/write command and the data buffer. If the disk access range contains the defective sector, the disk access controller suspends the disk access when a head has reached the defective sector. During suspension of the disk access, the disk access controller causes the buffer access circuit to copy data between an area of the alternate sector buffer and the data buffer. The area of the alternate sector buffer stores the data corresponding to the data written in the alternate sector allocated to the defective sector that is contained in the disk access range.

Additional aspects and advantages of the invention will be set forth in the description which follows, and in part will be obvious from the description, or may be learned by practice of the invention. The aspects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
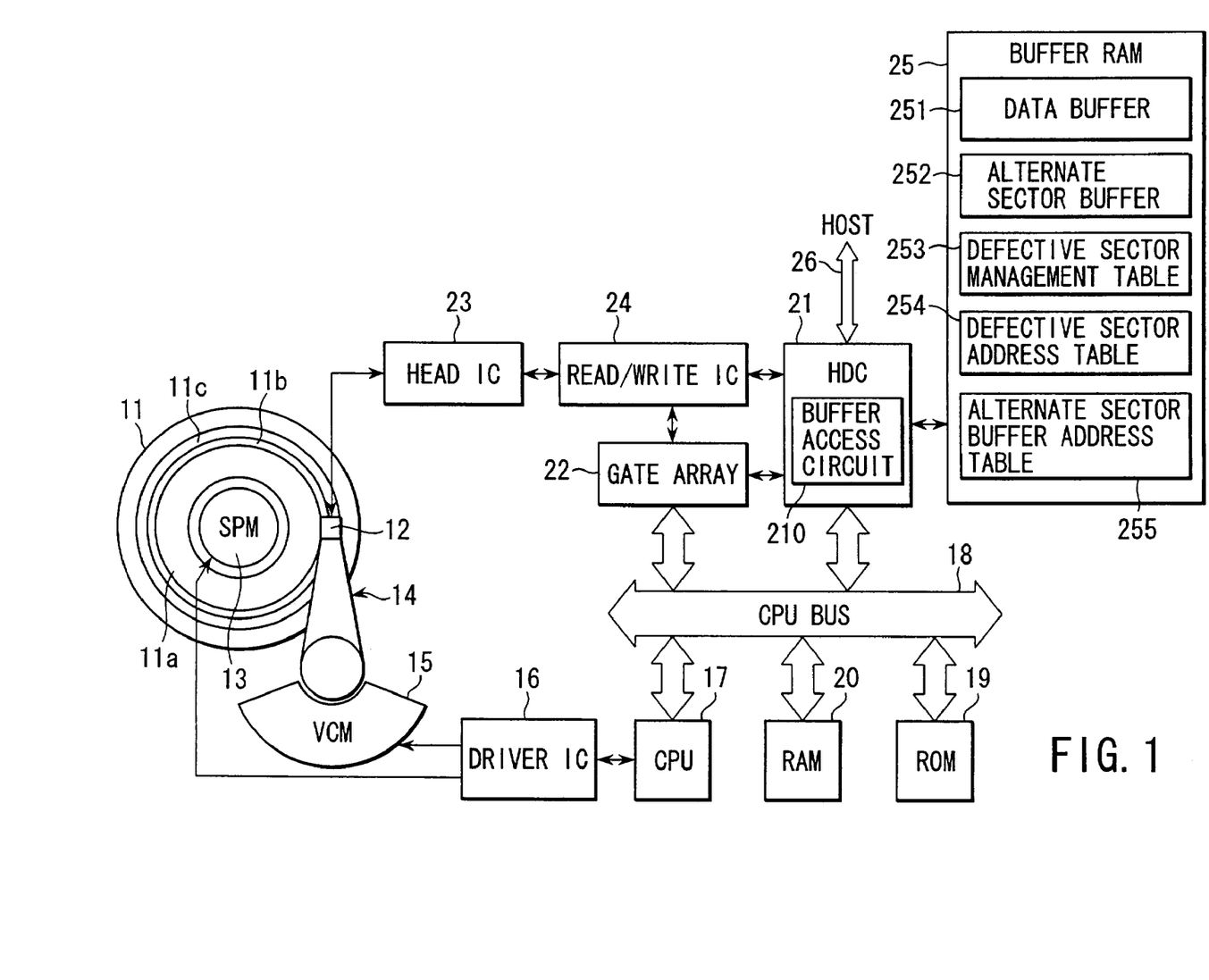
FIG. 1 is a block diagram illustrating the configuration of a hard disk drive according to an embodiment of the invention.

A hard disk drive for recording and reproducing audio-visual (AV) data, according to an embodiment of the invention, will be described in detail with reference to the accompanying drawings. FIG. 1 is a block diagram illustrating the configuration of the hard disk drive. In the hard disk drive (hereinafter referred to as an "HDD") shown in FIG. 1, a disk (magnetic disk) 11 as a recording medium has two, i.e., upper and lower, surfaces. One or both of the two surfaces of the disk 11 are used as recording surfaces on which data is magnetically recorded. A head (magnetic head) 12 is provided for each recording surface of the disk 11. The head 12 floats above the disk 11 in accordance with the rotation of the disk 11 when the HDD operates. The head 12 is used to write data to the disk 11 (data recording) and to read data from the disk 11 (data reproduction). Although the HDD shown in FIG. 1 is assumed to have a single disk 11, it may have a plurality of stacked disks 11.

Each recording surface of the disk 11 has a user area 11a, alternate area 11b and management area 11c. The user area 11a is used by a user. The alternate area 11b comprises alternate tracks. Each alternate track comprises sectors used as alternate sectors to be allocated to defective sectors on the disk 11. The management area 11c is used to store information necessary for system management (i.e. system management information). The system management information contains defective sector management information. The defective sector management information indicates the correspondency between each defective sector and a sector (alternate sector) allocated to each defective sector. The defective sector management information contains a pair of addresses assigned to each defective sector and a sector (alternate sector) corresponding thereto. In the example of FIG. 1, the alternate area 11b is an annular area that surrounds the user area 11a. However, the alternate area 11b may be provided inside the user area 11a. Further, two alternate areas, which are provided inside and outside the user area 11a, may be used. In addition, a format of the CDR (Constant Density Recording) type may be employed in the disk 1. In this case, since the user area 11a is divided into a plurality of annular zones, an alternate area may be provided for each zone. The alternate area 11b and management area 11c are used only by the system. In other words, these areas are non-user areas that cannot be recognized by the user. The area formed of the alternate area 11b and management area 11c is called a system area. Alternatively, only the management area 11c may be called a system area.

The disk 11 is rotated at high speed by a spindle motor (hereinafter referred to as an "SPM") 13. The head 12 is attached to the tip of an actuator (carriage) 14. The head 12 is radially moved in accordance with the swing operation of the actuator 14. As a result, the head is positioned to a target track. The actuator 14 has a voice coil motor (hereinafter referred to as a "VCM") 15 serving as a drive source for the actuator 14. Thus, the actuator 14 is driven by the VCM 15. The SPM 13 and VCM 15 are driven by driving currents (SPM current and VCM current) independently supplied from a driver IC (Integrated Circuit) 16. The driver IC 16 is a motor driver in the form of an IC chip, and serves as SPM and VCM drivers. The values (control variables) for determining the driving currents to be supplied from the driver IC 16 to the SPM 13 and VCM 15 are determined by a CPU 17.

The CPU 17 is the main controller of the HDD. The CPU 17 controls each section in the HDD in accordance with the control program stored in a ROM 19. For example, the CPU 17 serves as a disk access controller and data loading controller. Using the function as the disk access controller, the CPU 17 controls disk read/write (disk access) operations of a disk controller 21 in accordance with a read/write command supplied from a host. The host is an electronic device using the HDD of FIG. 1, which is represented by a personal computer. Further, using the function as the data loading controller, the CPU 17 executes, upon turn on of the HDD, control for copying, to an alternate sector buffer 252 described later, the data in each alternate sector on the alternate area 11b allocated to a corresponding defective sector on the disk 11. The CPU 17 also executes positioning control for positioning the head 12 to a target track by driving the actuator 14 via the driver IC 16. The CPU 17 further executes alternate sector processing when a new defective sector has been detected during disk access. The CPU 17 executes, upon turn on of the HDD, table generation processing for generating a defective sector management table 253, defective sector address table 254 and alternate sector buffer address table 255, which will be described later.

The CPU 17 is connected to a CPU bus 18. The CPU bus 18 is also connected to a ROM (Read Only Memory) 19, RAM (Random Access Memory) 20, disk controller (hereinafter referred to an "HDC") 21 and gate array 22. The ROM 19 prestores a program (control program) to be executed by the CPU 17. A part of the RAM 20 is used as a work area for the CPU 17. The HDC 21 is connected to the gate array 22, read/write IC 24 and buffer RAM 25, as well as to the CPU bus 18. The HDC 21 is further connected to the host via a host interface 26. The HDC 21 has an interface control function, disk control function and buffer control function. Using the interface control function, the HDC 21 controls reception of a command from the host, and controls data transfer between itself and the host. Using the disk control function, the HDC 21 controls data transfer between itself and the disk 11. Using the buffer control function, the HDC 21 controls the buffer RAM 25. The HDC 21 comprises a buffer access circuit 210. The buffer access circuit 210 realizes part of the disk control function and buffer control function. This circuit will be described in detail later. The gate array 22 generates signals necessary for controlling the HDD.

The head 12 is connected to a head IC (head amplifier circuit) 23. The head IC comprises a read amplifier (not shown) for amplifying a read signal read by the head 12, and a write amplifier (not shown) for converging write data into a write current. The head IC 23 is connected to a read/write IC (read/write channel) 24. The read/write IC 24 executes various types of signal processing. The signal processing includes A/D conversion of the read signal, encoding of write data and decoding of read data.

In the HDD of FIG. 1, when a read command from the host is executed, the head 12 reads a data signal recorded on the disk 11. The read command designates the area of the disk 11 on which the data signal is recorded. The signal (analog signal) read by the head 12 is amplified by the head IC 23. The amplified signal is decoded by the read/write IC 24. The HDC 21 processes the data, decoded by the read/write IC 24, in accordance with a control signal from the gate array 22, thereby generating data (read data) to be transferred to the host. This data is once stored into the buffer RAM 25, then transferred to the host by the HDC 21. On the other hand, when a write command from the host is executed, the host transfers data (write data) to the HDC 21. The write data transferred from the host is once stored into the buffer RAM 25, then transferred to the read/write IC 24 by the HDC 21 in accordance with a control signal from the gate array 22. The read/write IC 24 encodes the data. The encoded write data is converted into a write signal by the head IC 23. The resultant write signal is written, by the head 12, to the area of the disk 11 designated by the write command.

The buffer RAM 25 stores respective areas dedicated to a data buffer 251 and alternate sector buffer 252. The data buffer 251 is used to temporarily store the data transferred between the host and HDD (i.e. the HDC 21 in the HDD). The alternate sector buffer 252 is used to store data corresponding to the data in alternate sectors allocated to defective sectors (i.e. a copy of the data in each alternate sector). The buffer RAM 25 also stores areas for saving a defective sector management table 253, defective sector address table 254 and alternate sector buffer address table 255. The defective sector management table 253 is used to store defective sector management information recorded on the management area 11c of the disk 11. The defective sector address table 254 is a list of addresses assigned to defective sectors. This table is used by the CPU 17 to suspend disk access by the HDC 21 when the HDC 21 detects a defective sector during disk access. The alternate sector buffer address table 255 is a list of addresses (i.e. buffer addresses) of the data items stored in the alternate sector buffer 252. The addresses in the table 255 indicate the addresses in the alternate sector buffer 252 that store a copy of data in each alternate sector. In accordance with the table 255, the CPU 17 informs the HDC 21 of the address or addresses in the alternate sector buffer 252 that are to be accessed during suspension of disk access. The RAM 20 may hold the tables 253–255, instead of the buffer RAM 25.

Figure 2A:
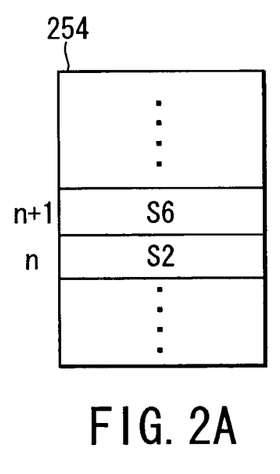
FIG. 2A is a view illustrating an example of a data structure of the defective sector address table 254 appearing in FIG. 1.
Figure 2B:
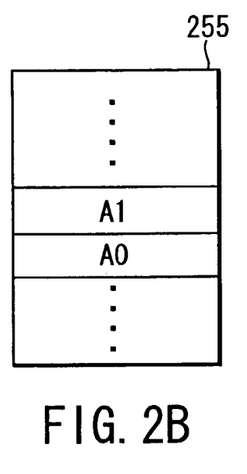
FIG. 2B is a view illustrating an example of a data structure of the alternate sector buffer address table 255 appearing in FIG. 1.
Figure 2C:
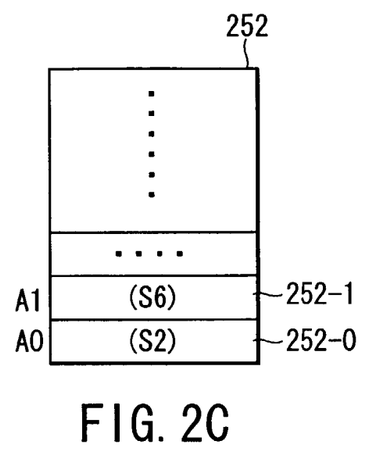
FIG. 2C is a view illustrating an example of storage of alternate sectors in the alternate sector buffer 252 appearing in FIG. 1.

FIGS. 2A and 2B illustrate the data structure examples of the defective sector address table 254 and alternate sector buffer address table 255, respectively. FIG. 2C illustrates an example of alternate sector data stored in the alternate sector buffer 252. The examples of FIGS. 2A and 2B correspond to the example of FIG. 2C. In the example of FIG. 2C, data (S2) is stored in an area 252-0 corresponding to one sector (e.g. 512 bytes) that starts at a buffer address (byte address) A0 in the alternate sector buffer 252. The data (S2) is the data in the alternate sector allocated to a defective sector S2 on the disk 11. Similarly, data (S6) is stored in an area 252-1 corresponding to one sector that starts at a buffer address (byte address) A1 in the buffer 252. The data (S6) is the data in the alternate sector allocated to a defective sector S6 on the disk 11. In this case, entries n and n+1 in the defective sector address table 254 store the addresses (disk addresses) of the defective sectors S2 and S6 (see FIG. 2A). On the other hand, entries n and n+1 in the alternate sector buffer address table 255 store the start addresses A0 and A1 of the areas 252-0 and 252-1 in the alternate sector buffer 252 (see FIG. 2B). The entries n and n+1 of the alternate sector buffer address table 255 are situated at the relatively same positions as the entries n and n+1 of the defective sector address table 254.

In the embodiment, to facilitate the explanation, assume that one entry is used for one defective sector in the defective sector address table 254 and alternate sector buffer address table 255. However, where a number of serial defective sectors exist on the disk 11, they can be dealt with using only one entry, if a pair of information items indicative of the address of the leading defective sector and the number of serial defective sectors, respectively, are used. This will be described in more detail, exemplifying the case where serial three sectors S2–S4 are defective, and data on the corresponding three alternate sectors is stored in the area corresponding to three sectors, which starts at the address A0 in the alternate sector buffer 252. In this case, a pair of information items indicative of the address of the sector S2 and the number of defective sectors, 3, respectively, are stored in an entry m in the defective sector address table 254. Further, the buffer address A0 is stored in an entry m in the alternate sector buffer address table 255.

Figure 3:
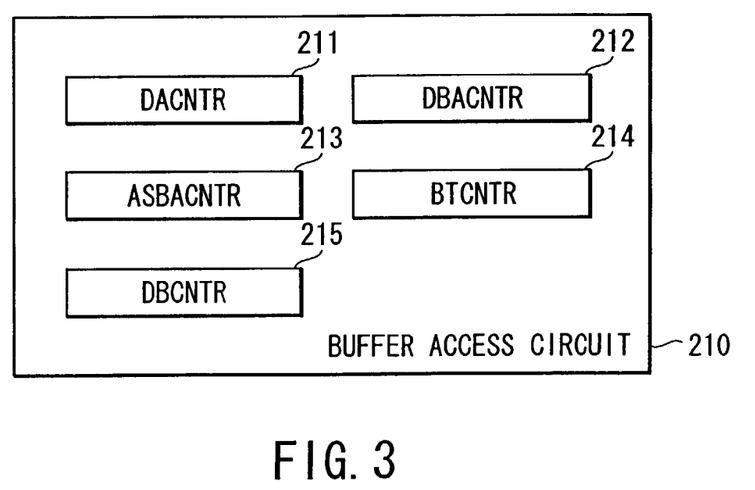
FIG. 3 is a block diagram illustrating the configuration of the buffer access circuit 210 appearing in FIG. 1.
Figure 4A:
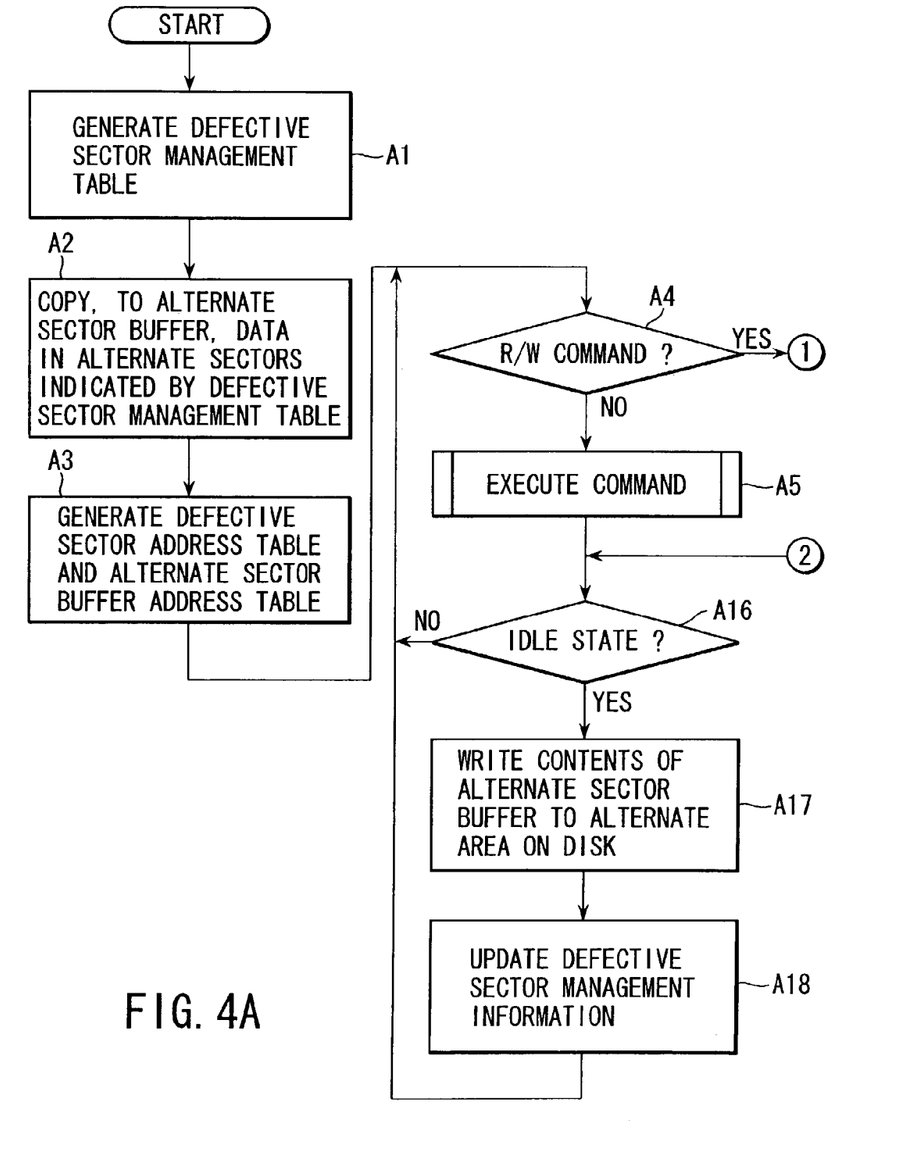
FIGS. 4A and 4B are flowcharts useful in explaining the procedure of the operation executed in the embodiment.
Figure 4B:
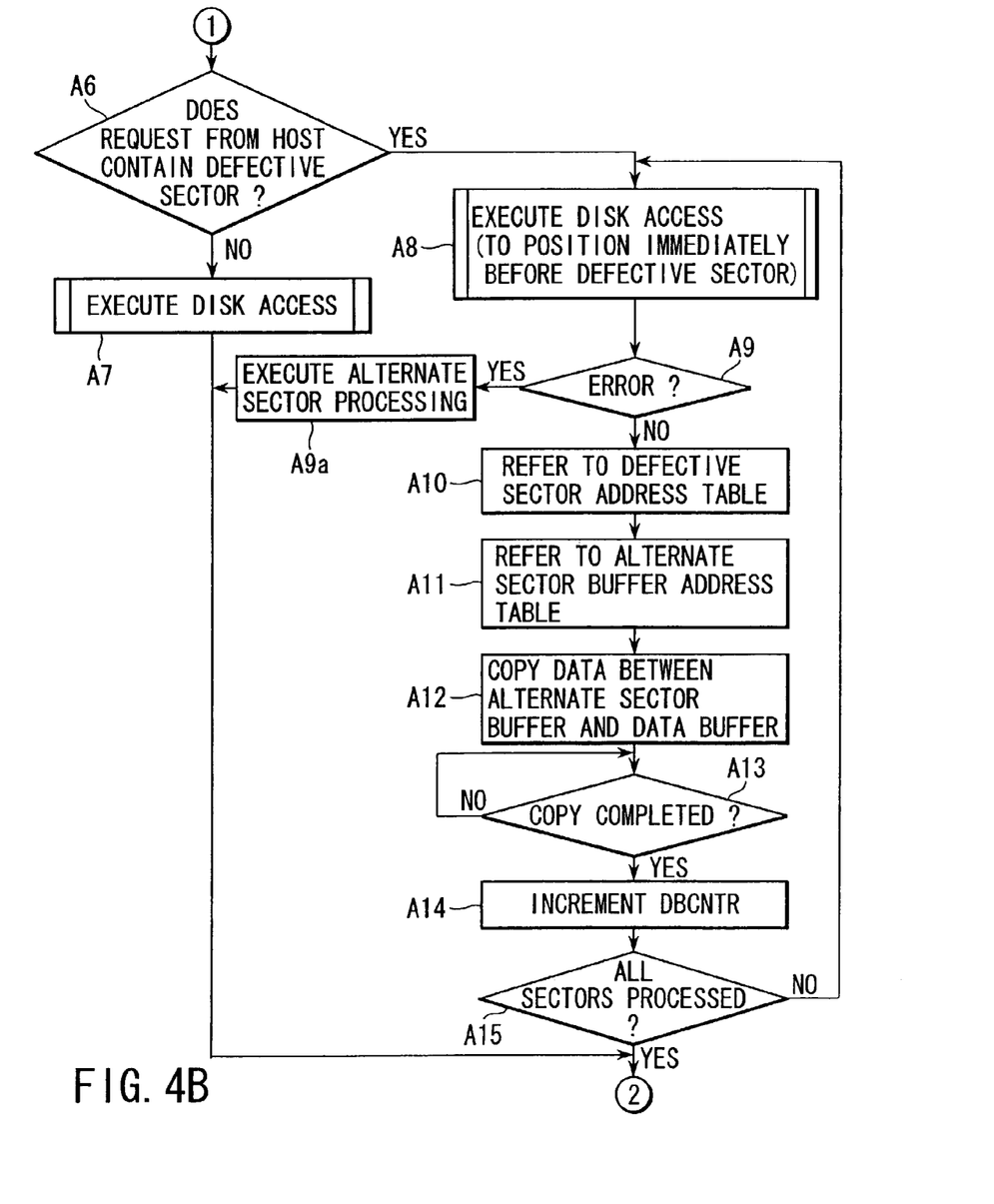

FIG. 3 illustrates the configuration of the buffer access circuit 210 of the HDC 21. As shown in FIG. 3, the buffer access circuit (BAC) 210 comprises a disk address counter (hereinafter referred to as "DACNTR") 211, data buffer address counter (hereinafter referred to as "DBACNTR") 212, alternate sector buffer address counter (hereinafter referred to as "ASBACNTR") 213, buffer transfer counter (hereinafter referred to as "BTCNTR") 214 and data buffer counter (hereinafter referred to as "DBCNTR") 215. The DACNTR 211 is used to indicate, by counting, a to-be-accessed address (disk address) of the disk 11. The start address of a to-be-accessed disk address range (disk area) on the disk 11 is set as initial data in the DACNTR 211. The DBACNTR 212 is used to indicate, by counting, a to-be-accessed address of the data buffer 251. The start address for accessing the data buffer 251 is set as initial data in the DBACNTR 212. The ASBACNTR 213 is used to indicate, by counting, a to-be-accessed address of the alternate sector buffer 252. The start address for accessing the alternate sector buffer 252 is set as initial data in the ASBACNTR 213. The BTCNTR 214 is a backward counter for decrementing its count value one by one each time data of a predetermined size (e.g. one byte) is transferred. The DBCNTR 215 is a counter for indicating, in units of sectors, the position of the data in the data buffer 251, transferred between the data buffer 251 and host.

Referring to FIGS. 4A, 4B, 5 and 6, the operation of the embodiment will be described. Assume that the HDD of FIG. 1 has been turned on. At this time, initialization is executed in the HDD. The embodiment is characterized partly in that the following processing (in particular, the processing at the steps A2 and A3) is executed during the initialization of the HDD. Firstly, the CPU 17 executes known control for generating the defective sector management table 253 in the buffer RAM 25 (step A1). Specifically, the defective sector management table 253 is generated by reading the defective sector management information recorded on the management area 11c of the disk 11, and copying it to the buffer RAM 25.

Subsequently, the CPU 17 executes control for copying the data in the alternate sectors, illustrated in the defective sector management table 253, to the alternate sector buffer 252 in the buffer RAM 25 (step A2). During control at the step A2, the data in alternate sectors is read from the disk 11 in the order beginning from the leading alternate sector, on the basis of the addresses (addresses of the alternate sectors) stored in the defective sector management table 253, as will now be described. At first, the address of the leading alternate sector (disk address), the leading buffer address and transfer size (the number of bytes) are set in the DACNTR 211, ASBACNTR 213 and BTCNTR 214, respectively. In this state, the CPU 17 instructs the buffer access circuit 210 to transfer data from the disk 11 to the alternate sector buffer 252. Then, the data in all the alternate sectors indicated by the defective sector management table 253 is sequentially read from the disk 11. The alternate sector data read from the disk 11 is transferred to the buffer RAM 25. The alternate sector data transferred to the buffer RAM 25 is stored into the alternate sector buffer 252 of the buffer RAM 25 in the order beginning from the one with the start buffer address. At this time, the count value of the ASBACNTR 213 is incremented in units of, for example, bytes. Further, the count value of the DACNTR 211 is incremented in units of, for example, sectors (in this case, in units of 512 bytes). Assume that FIG. 2C illustrates the contents of the alternate sector buffer 252 under the above conditions. In the example of FIG. 2C, the data items (S2) and (S6) in the alternate sectors allocated to the defective sectors S2 and S6 are written to the areas 252-0 and 252-1 corresponding to respective sectors that start at the buffer addresses A0 and A1 of the alternate sector buffer 252, respectively.

Thereafter, the CPU 17 generates the defective sector address table 254 on the basis of the defective sector management table 253 in the buffer RAM 25 (step A3). The generated defective sector address table 254 is stored in the buffer RAM 25. Assume that the defective sector address table 254 stores the addresses of defective sectors including the sectors S2 and S6, as is shown in FIG. 2A. At the step A3, the CPU 17 also generates the alternate sector buffer address table 255. Specifically, the alternate sector buffer address table 255 is generated in the following manner. The CPU 17 generates buffer addresses (addresses in the alternate sector buffer 252) in units of 512 bytes in the order beginning from the start buffer address initially set in the ASBACNTR 213 at the step A2. Each time the CPU 17 generates a buffer address, it generates one entry for the alternate sector buffer address table 255. Each time the CPU 17 generates one entry for the table 255, it stores the generated buffer address into the entry. Thus, the alternate sector buffer address table 255 is generated in which the respective generated buffer addresses (addresses in the alternate sector buffer 252) are stored in order in the sequential entries. The alternate sector buffer address table 255 is stored in the buffer RAM 25. As is apparent, the buffer address stored in an entry i is an address of the alternate sector buffer 252, the address indicating the location of data stored in the buffer 252 corresponding to the data written in the alternate sector (allocated to the corresponding defective sector) indicated in the entry i of the defective sector address table 254. In this embodiment, the alternate sector buffer address table 255 generated at the step A3 stores buffer addresses that include the addresses A0 and A1 in the entries n and n+1, respectively, as shown in FIG. 2B.

After the initialization of the HDD including the processing at the steps A1–A3 finishes, the HDD can receive a command from the host. Assume that the host has issued a command to the HDD in this state. The command from the host is reported from the HDC 21 to the CPU 17. Then, the CPU 17 determines whether or not the command from the host is a read/write command (R/W command)(step A4). If the command is not the read/write command, the CPU 17 executes the command (step A5).

On the other hand, if the command is the read/write command, the CPU 17 controls the HDC 21 so as to process the read/write command in the following manner. Assume here that the command from the host is a read command. Firstly, the CPU 17 determines, referring to the defective sector address table 254, whether or not a defective sector exists in the disk access range designated by the read command (request from the host) (step A6). The disk access range is determined from the start disk address and size (the number of sectors).

If the determination result at the step A6 indicates that the designated disk access range does not contain a defective sector (to which an alternate sector is allocated), the CPU 17 executes the disk access operation designated by the read command from the host (step A7). On the other hand, if the determination result at the step A6 indicates that the designated disk access range contains defective sectors, the CPU 17 executes disk access in the disk area that is included in the designated disk access range and located immediately before the initial defective sector (step A8). Assume that the designated disk access range is the disk area containing sectors S0–S7 shown in FIG. 6. Further, in FIG. 6, assume that the hatched sectors S2 and S6 included in the sectors S0–S7 are defective. In this case, at the step A8, a disk access operation 701 is executed, in the following manner, on the disk area of the disk 11, which ranges from the sector S0 to the sector S1 located immediately before the defective sector S2.

Before the disk access operation 701, the CPU 17 set, in the DBCNTR 215 as an initial value, the value indicative of the position of the leading sector for data transmission between the data buffer 251 and host. Further, the CPU 17 performs a seek operation (seek control) for moving the head 12 to the track on the disk 11 indicated by the start disk address. After the seek operation, the CPU 17 sets the buffer access circuit 210 to a read mode. Further, the CPU 17 sets the disk address indicative of the start sector S0, as an initial value for the DACNTR 211 of the buffer access circuit 210. Furthermore, the CPU 17 sets the start buffer address and the number of bytes of transfer data corresponding to two sectors (2×512) as initial values for the DBACNTR 212 and BTCNTR 214 of the buffer access circuit 210, respectively. After this initialization, the CPU 17 activates the buffer access circuit 210 to execute the disk access operation 710. As a result, the data items (S0) and (S1) in the sectors S0 and S1 are sequentially read from the disk 11. As indicated by the arrows 711 and 712 in FIG. 6, the data items (S0) and (S1) read from the sectors S0 and S1 are sequentially stored into the data buffer 251. This disk access operation will be described in detail later.

If a new defective sector is detected during the disk access operation 701 at the step A8 (step A9), alternate sector processing (step A9a) is performed, followed by processing at a step A16 described later. In the alternate sector processing, the defective sector management information stored in the defective sector management table 253 of the buffer RAM 25 is updated. At this stage, the defective sector management information recorded on the management area 11c of the disk 11 is not updated. In other words, disk access for updating the defective sector management information is not performed. The updating of the defective sector management information recorded on the management area 11c is performed when the HDD is in an idle state, as will be described later. If a defective sector is detected during disk access requested by a write command, the to-be-written data is written to the alternate sector buffer 252 instead of the corresponding alternate sector.

On the other hand, assume that the disk access operation 701 at the step A8 has finished normally (step A9). At this time (i.e., immediately before the defective sector S2), the CPU 17 instructs the HDC 21 to suspend the disk access operation. After that, the CPU 17 refers to the defective sector address table 254 and alternate sector buffer address table 255 (steps A10 and A11). At the step A10, the CPU 17 determines the size of data to be copied from the alternate sector buffer 252 to the data buffer 251. This size is determined referring to the defective sector address table 254. In the examples of FIGS. 2A–2C, the size of the to-be-copied data is one sector size (i.e. 512 bytes) corresponding to the defective sector S2. At the next step A11, the CPU 17 determines, referring to the alternate sector buffer address table 255, the start buffer address related to the alternate sector buffer 252 from which data is to be copied. In the examples of FIGS. 2A–2C, the start buffer address is the address A0 assigned to the area in the alternate sector buffer 252 that stores the data (S2) of the alternate sector corresponding to the defective sector S2. In the case of a write command, the start buffer address in the alternate sector buffer 252, to which data is to be written, is determined with reference to the alternate sector buffer address table 255.

Thereafter, the CPU 17 causes the buffer access circuit 210 of the HDC 21 to execute data copy 702 from the alternate sector buffer 252 to the data buffer 251 (step A12). In the case of a write command, data is copied from the data buffer 251 to the alternate sector buffer 252. At the step A12, the CPU 17 sets, for the data copy, the determined data size (data transfer size) (512 bytes) and start buffer address in the BTCNTR 214 and ASBACBTR 213 of the buffer access circuit 210, respectively. At this time, the value of the DBACNTR 212 of the buffer access circuit 210 indicates a buffer address in the data buffer 251. The buffer address indicated by the DBACNTR 212 is the address next to the address storing data (S1) in the sector S. In this state, the CPU 17 re-activates the buffer access circuit 210 that is in the read mode. Thus, the CPU 17 causes the buffer access circuit 210 to execute data copy 702 for copying the alternate sector data (S2) corresponding to data in the defective sector S2 during suspension of disk access. Even during the suspension of disk access, the disk 11 is rotated by the SPM 13. This suspension period corresponds to the period required for the head 12 to move, relative to the disk 11, from the rear end of the sector S1 to the rear end of the defective sector S2. In other words, this period corresponds to the period required for the head 12 to move, relative to the disk 11, from the front end of the defective sector S2 to the front end of the next sector S3.

When the buffer access circuit 210 has been activated by the CPU 17, it executes data copy 702. Specifically, the buffer access circuit 210 reads the data (S2) of 512 bytes (corresponding to one sector) corresponding to the data in the alternate sector allocated to the defective sector S2, from the area 252-0 of the alternate sector buffer 252 in the order beginning from the buffer address A0 indicated by the ASBACNTR 213. The buffer access circuit 210 copies the data (S2), read from the alternate sector buffer 252, to the data buffer 251, as is indicated by the arrow 713 in FIG. 6. At this time, the count values of the ASBACNTR 213 and DBACNTR 212 are each incremented by one whenever data of one byte is copied (transferred). Further, the count value of the BTCNTR 214 is decremented by one whenever data of one byte is copied. When the count value of the BTCNTR 214 has reached "0", the buffer access circuit 210 ceases its operation. At this time, the buffer access circuit 210 informs the CPU 17 of the completion of data copy 702, using, for example, an interrupt (termination interrupt). As aforementioned, data copy 702 is executed by the buffer access circuit 210 independently of the CPU 17. Accordingly, data copy 702 can be reliably finished within the time period required for the head 12 to move, relative to the disk 11, from the front end to the rear end of the defective sector S1 (i.e., while the head 12 is on the defective sector S1).

Upon receiving a report of data copy end from the buffer access circuit 210, the CPU 17 determines the completion of data copy (step A13). In other words, the CPU 17 determines that data transfer from the alternate sector on the disk 11 to the data buffer 251 has finished. After that, the CPU 17 increments the count value of the DBCNTR 215 by the number of copied sectors (step A14). As a result, transfer of copied data (data from the alternate sector) from the data buffer 251 to the host is enabled on the basis of the DBCNTR 215.

Subsequently, the CPU 17 determines whether or not the operation of reading all the sectors designated by the host has been completed (step A15). If a non-processed sector remains as in this example, the CPU 17 returns to the step A8. In the second-time processing at the step A8, disk access 703 for sequentially reading data items (S3), (S4) and (S5) from the sectors S3, S4 and S5 of the disk 11 is executed. As a result, as indicated by the arrows 714, 715 and 716 in FIG. 6, the data times (S3), (S4) and (S5) read from the sectors S3, S4 and S5 are stored in the data buffer 251 in this order.

Disk access is suspended immediately before the defective sector S6. When disk access is suspended, copy 704 of the data (S6) in the alternate sector corresponding to the defective sector S6 is executed as shown in FIG. 2, using the buffer access circuit 210. Specifically, the data (S6) in the alternate sector corresponding to the defective sector S6 is read from the alternate sector buffer 252. The data (S6) read from the alternate sector buffer 252 is copied to the data buffer 251 as indicated by the arrow 717 in FIG. 6. After that, the same processing as that executed when the data copy 702 (713) is completed is performed.

After the read operation is performed concerning all the sectors requested by the host (step A15), the CPU 17 determines whether or not the HDD is in the idle state (step A16). The idle state of the HDD means the state, assumed while the SPM 13 is rotating, in which the head 12 is retracted to a head retraction position (not shown), represented by the position of a ramp. This idle state is assumed if the HDD does not receive a read/write command from the host for a predetermined time period or more while the SPM 13 is rotating. In the idle state, the supply of power to some circuits in the HDD may be interrupted to save power.

If the HDD is in the idle state (step A16), the CPU 17 proceeds to a step A17. On the other hand, if the HDD is not in the idle state (step A16), the CPU 17 returns to the step A4. When the HDD has been shifted to the idle state, the CPU 17 executes control for writing the contents of the alternate sector buffer 252 to the alternate area 11b of the disk 11 (step A17). Subsequently, the CPU 17 executes control for updating the defective sector management information recorded on the management area 11c of the disk 11 (step A18). After the step A18, the CPU 17 waits for a command from the host.

As described above, in the embodiment, two defective sectors S2 and S6 exist in the disk access range designated by the host. However, in the embodiment, disk access is suspended when the head 12 has reached any one of the defective sectors existing in the disk access range, with reference to the defective sector address table 254 set in the buffer RAM 25. During the suspension of disk access, the buffer access circuit 210 executes data copy between the alternate sector buffer 252 and data buffer 251, referring to the tables 254 and 255. As a result, even if the disk access range designated by the host contains a defective sector to which an alternate sector is allocated, it is not necessary to stop disk access, which differs from the prior art. Further, since access to an alternate sector on the disk 11 is not necessary, a rotational delay of the disk 11 due to the access to an alternate sector does not occur. Accordingly, even if the designated disk access range contains a defective sector, the embodiment can realize the same access performance as in normal disk access free from a defective sector.

Figure 5:
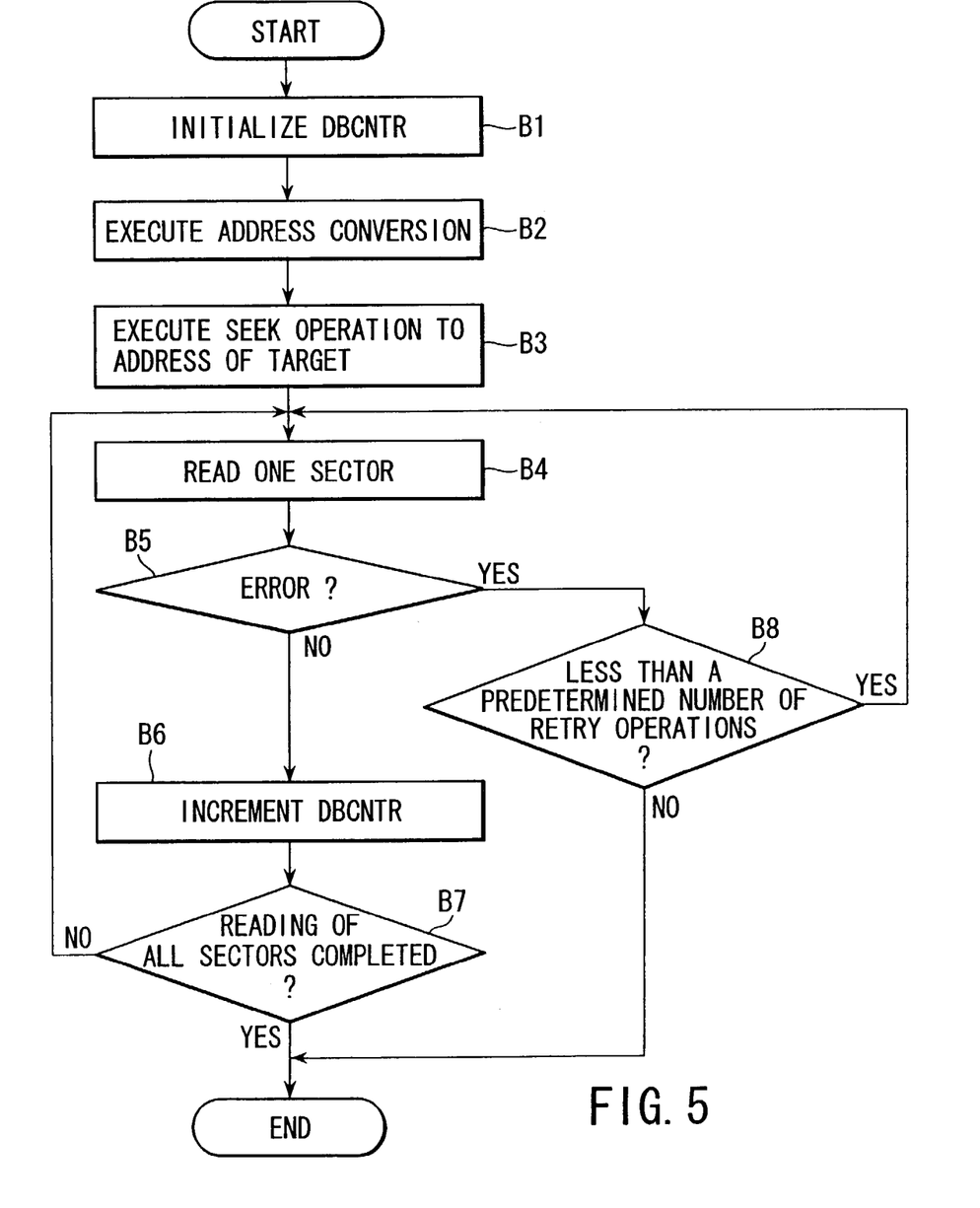
FIG. 5 is a flowchart useful in explaining, in detail, the procedure of disk access performed at steps A7 and A8 of FIG. 4B.
Figure 6:
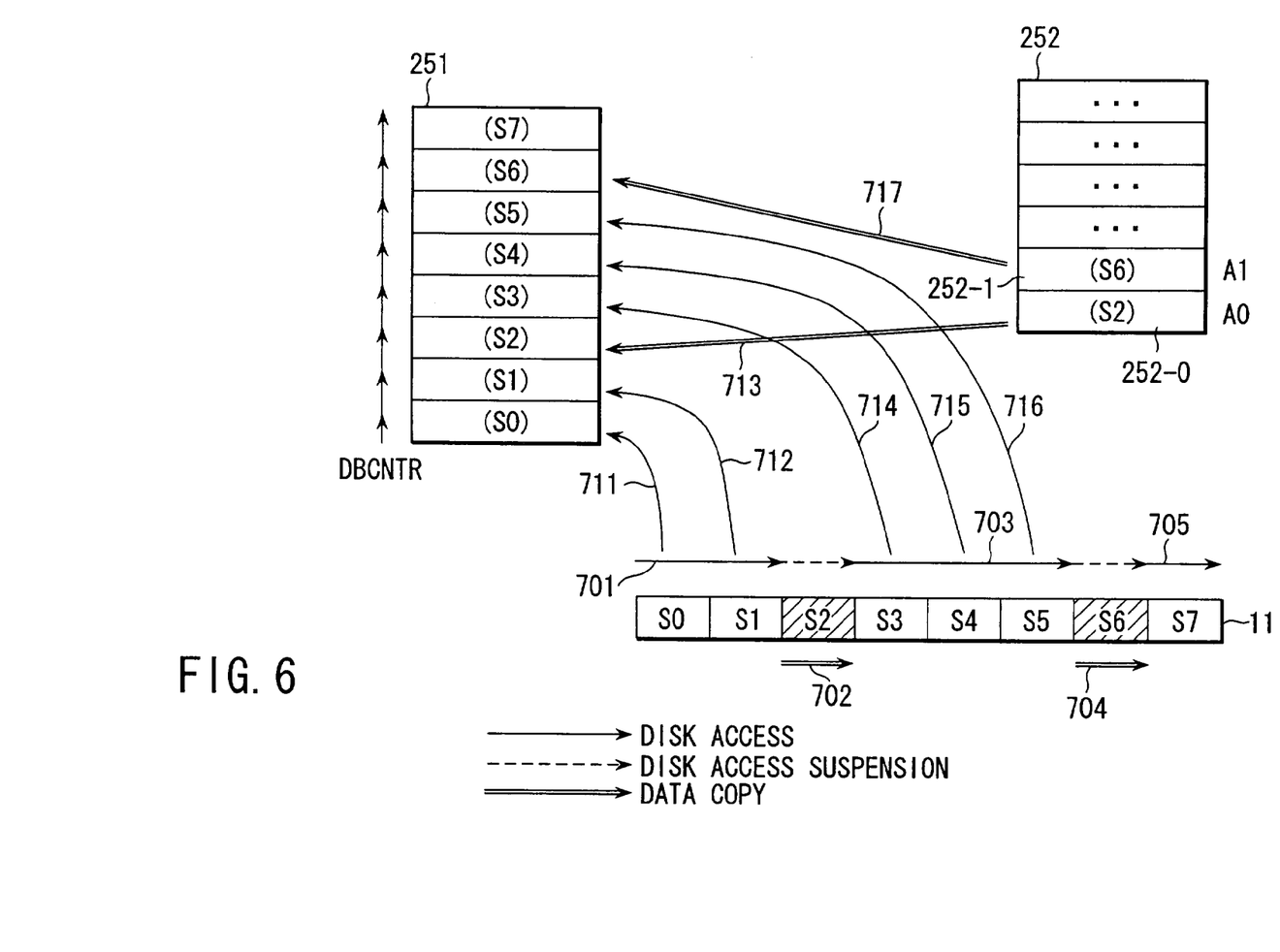
FIG. 6 is a view useful in explaining the operation executed in the embodiment when the disk access range designated by a host contains defective sectors.

As regards particulars about disk access executed at the steps A7 and A8, a description will be given of, for example, the case where the command from the host is a read command. The flowchart of FIG. 5 illustrates the procedure of this disk access. As shown in FIG. 5, firstly, the CPU 17 sets, in the DBCNTR 215 of the buffer access circuit 210, an initial value for the pointer position of the data buffer 251 as the start position of data transfer from the data buffer 251 to the host (step B1). Subsequently, the CPU 17 converts a logical disk address, indicative of the leading position to be accessed, into a physical address (hereinafter referred to as "target address") on the disk 11 (step B2). The track on the disk 11, designated by the target address, is called "target track". The CPU 17 executes a seek operation (seek control) to move the head 12 to the target track (step B3). If the target track as the target of the seek operation at the step B3 is identical to the target track in the previous disk access, the seek operation is finished at once, and no actual seek operation is performed.

After the completion of the seek operation, the CPU 17 sets initial values in the DACNTR 211, DBACNTR 212 and BTCNTR 214 of the buffer access circuit 210 to activate the circuit 210. As a result, a disk access operation is performed in accordance with the DACNTR 211, DBACNTR 212 and BTCNTR 214 (step B4). During the disk access operation, data is read from the disk 11 in units of sectors, and the read data is stored in the data buffer 251. Each time data is read from one sector, the CPU 17 determines whether or not an error has occurred during the read operation (step B5).

If reading of data from one sector is normally executed, the CPU 17 increments the count value of the DBCNTR 215 by one (step B6). If a non-processed sector remains (step B7), the CPU 17 repeats disk access at the step B4 et seq. If, on the other hand, an error occurs during the data reading of a sector, the CPU 17 executes a retry operation a necessary number of times that do not exceed a predetermined number of times (step B8). If data cannot be normally read from the sector even after the retry operation is performed the predetermined number of times (step B8), the CPU 17 determines that the sector is defective. At this time, the CPU 17 allocates an arbitrary free sector on the alternate area 11b of the disk 11 to the defective sector as an alternate sector. Thereafter, the CPU 17 stores, in the defective sector management table 253, defective sector management information indicative of the relationship between the defective sector and alternate sector.

In the embodiment, the present invention is used in an HDD (Hard Disk Drive). However, the invention is also applicable to other disk storage apparatuses, such as an optical disk drive, magneto-optical disk drive, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus in which an arbitrary sector in an alternate area of a disk is allocated as an alternate sector to a defective sector on the disk, comprising:
   an alternate sector buffer which stores data corresponding to data written in the alternate sector allocated to the defective sector;
   a data buffer which temporarily stores data read from the disk and to be transferred to a host using the apparatus, and data transferred from the host and to be written to the disk;
   a buffer access circuit which copies data between the alternate sector buffer and the data buffer; and
   a disk access controller which controls disk access requested by a read/write command supplied from the host, during the disk access, data being transferred between a disk access range on the disk designated by the read/write command and the data buffer, the disk access controller suspending the disk access if the disk access range contains the defective sector and a head used to read/write data to the disk reaches the defective sector, the disk access controller causing, during suspension of the disk access, the buffer access circuit to copy data between an area of the alternate sector buffer and the data buffer, the area of the alternate sector buffer storing the data corresponding to the data written in the alternate sector allocated to the defective sector that is contained in the disk access range.

2. The apparatus according to claim 1, wherein the disk access controller resumes the disk access when the head has passed the defective sector contained in the disk access range and has reached a normal sector contained in the disk access range.

3. The apparatus according to claim 1, further comprising means for executing control for writing contents of the alternate sector buffer to the alternate area of the disk when the apparatus is in an idle state.

4. The apparatus according to claim 1, further comprising a data buffer counter which indicates, by counting, a position of a sector in the data buffer, data in the sector being a target to be transferred between the data buffer and the host, and wherein the disk access controller updates the data buffer counter by a number of sectors corresponding to an amount of data copy between the area of the alternate sector buffer and the data buffer, when the data copy has finished.

5. The apparatus according to claim 1, wherein:
   the buffer access circuit includes an alternate sector buffer address counter which indicates, by counting, a to-be-accessed address of the alternate sector buffer, and a data buffer address counter which indicate, by counting, a to-be-accessed address of the data buffer; and
   the buffer access circuit copies data between the alternate sector buffer and the data buffer on the basis of the alternate sector buffer address counter and the data buffer address counter.

6. The apparatus according to claim 1, further comprising a data loading controller which executes, upon turn on of the apparatus, control for copying, to the alternate sector buffer, the data written in the alternate sector in the alternate area allocated to the defective sector on the disk.

7. The apparatus according to claim 6, wherein:
   the buffer access circuit copies data between the alternate sector buffer and the data buffer, and also copies data between the disk and the alternate sector buffer; and
   the data loading controller causes the buffer access circuit to copy, to the alternate sector buffer, data in the alternate sector in the alternate area allocated to the defective sector on the disk.

8. The apparatus according to claim 7, wherein:
   the buffer access circuit includes an alternate sector buffer address counter which indicates, by counting, a to-be-accessed address of the alternate sector buffer, a data buffer address counter which indicates, by counting, a to-be-accessed address of the data buffer, and a disk address counter which indicates, by counting, a to-be-accessed address of the disk; and
   the buffer access circuit copies data between the alternate sector buffer and the data buffer on the basis of the alternate sector buffer address counter and the data buffer address counter, and copies data between the disk and the alternate sector buffer on the basis of the disk address counter and the alternate sector buffer address counter.

9. The apparatus according to claim 1, further comprising a memory holding a defective sector address table and an alternate sector buffer address table, the defective sector address table storing an address of the defective sector, the alternate sector buffer address table storing an address of the alternate sector buffer which stores data corresponding to data in the alternate sector allocated to the defective sector, and wherein the disk access controller suspends the disk access when the disk access has been executed up to the address of the defective sector, indicated by the defective sector address table, thereby causing the buffer access circuit to copy data between the data buffer and the area of the alternate sector buffer corresponding to the defective sector indicated by the alternate sector buffer address table.

10. The apparatus according to claim 1, further comprising:
   a memory holding a defective sector address table and an alternate sector buffer address table, the defective sector address table storing an address of the defective sector, the alternate sector buffer address table storing data in the alternate sector allocated to the defective sector; and
   a data loading controller which executes, upon turn on of the apparatus, control for copying, to the alternate sector buffer, the data written in the alternate sector in the alternate area allocated to the defective sector on the disk,
   and wherein the disk access controller suspends the disk access when the disk access has been executed up to the address of the defective sector, indicated by the defective sector address table, thereby causing the buffer access circuit to copy data between the data buffer and the area of the alternate sector buffer corresponding to the defective sector indicated by the alternate sector buffer address table.

11. The apparatus according to claim 10, wherein:
the buffer access circuit includes an alternate sector buffer address counter which indicates, by counting, a to-be-accessed address of the alternate sector buffer, and a data buffer address counter which indicates, by counting, a to-be-accessed address of the data buffer; and
the buffer access circuit copies data between the alternate sector buffer and the data buffer on the basis of the alternate sector buffer address counter and the data buffer address counter.

12. The apparatus according to claim 10, wherein:
the buffer access circuit includes an alternate sector buffer address counter which indicates, by counting, a to-be-accessed address of the alternate sector buffer, a data buffer address counter which indicates, by counting, a to-be-accessed address of the data buffer, and a disk address counter which indicates, by counting, a to-be-accessed address of the disk; and
the buffer access circuit copies data between the alternate sector buffer and the data buffer on the basis of the alternate sector buffer address counter and the data buffer address counter, and copies data between the disk and the alternate sector buffer on the basis of the disk address counter and the alternate sector buffer address counter.

13. The apparatus according to claim 10, wherein:
a predetermined area of the disk is allocated to a management area used to store system management information, the system management information including defective sector management information used to manage a relationship between each of the defective sector on the disk and the alternate sector in the alternate area allocated to the defective sector; and
the data loading controller executes, in accordance with the defective sector management information, control for copying, to the alternate sector buffer, data in the alternate sector in the alternate area allocated to the defective sector.

14. The apparatus according to claim 13, wherein:
the memory holds a defective sector management table that stores the defective sector management information recorded on the management area; and
the data loading controller executes, in accordance with the defective sector management information stored in the defective sector management table, control for copying, to the alternate sector buffer, data in the alternate sector in the alternate area.

15. The apparatus according to claim 14, further comprising:
means for updating the defective sector management information stored in the defective sector management table if an alternate sector is allocated to a defective sector newly detected during the disk access; and
means for executing control for writing contents of the alternate sector buffer to the alternate area of the disk, and control for updating the defective sector management information recorded on the management area of the disk, on the basis of the defective sector management table, if the apparatus is in an idle state.

16. The apparatus according to claim 10, further comprising means for generating, in the memory, the defective sector address table and the alternate sector buffer address table, the generating means generating the defective sector address table and the alternate sector buffer address table when the data in the alternate sector in the alternate area allocated to the defective sector is copied to the alternate sector buffer.

17. A method of accessing a disk containing an alternate sector, for use in a disk storage apparatus in which an arbitrary sector in an alternate area of the disk is allocated as the alternate sector to a defective sector on the disk, the disk storage apparatus including an alternate sector buffer which stores data corresponding to data written in the alternate sector allocated to the defective sector, and a data buffer which stores data read from the disk and to be transferred to a host using the disk storage apparatus, and data transferred from the host and to be written to the disk, comprising:
determining whether a disk access range designated by a read/write command from the host contains the defective sector;
suspending, if the disk access range contains the defective sector, disk access including data transfer between the data buffer and the disk access range, when a head used to read/write data from/to the disk has reached the defective sector; and
copying data between an area of the alternate sector buffer and the data buffer during suspension of the disk access, the area of the alternate sector buffer storing the data written in the alternate sector allocated to the defective sector that is contained in the disk access range.

18. The method according to claim 17, further comprising resuming the disk access when the head has passed the defective sector contained in the disk access range and has reached a normal sector contained in the disk access range.

19. The method according to claim 17, further comprising writing contents of the alternate sector buffer to the alternate area on the disk when the disk storage apparatus is in an idle state.

20. The method according to claim 17, further comprising updating a data buffer counter by a number of sectors corresponding to an amount of data copy between the area of the alternate sector buffer and the data buffer, when the data copy has finished, the data buffer counter being used to indicate, by counting, a position of a sector in the data buffer, data written in the sector being a target to be transferred between the data buffer and the host.

21. The method according to claim 17, further comprising copying, to the alternate sector buffer upon turn on of the disk storage apparatus, the data written in the alternate sector in the alternate area allocated to the defective sector on the disk.

22. The method according to claim 17, wherein:
the disk access is suspended when the disk access has executed up to an address of the defective sector, indicated by a defective sector address table, the defective sector address table storing an address of the defective sector on the disk; and
an area of the alternate sector buffer corresponding to the defective sector contained in the disk access range is indicated by an alternate sector buffer address table, the alternate sector buffer address table storing an address of the alternate sector buffer which stores data corresponding to data in the alternate sector allocated to the defective sector on the disk.

* * * * *